Sept. 8, 1970 R. H. MARTIN ET AL 3,527,854
METHOD FOR THE CONTINUOUS PRODUCTION OF OPEN TOP CONTAINERS
Filed June 4, 1968
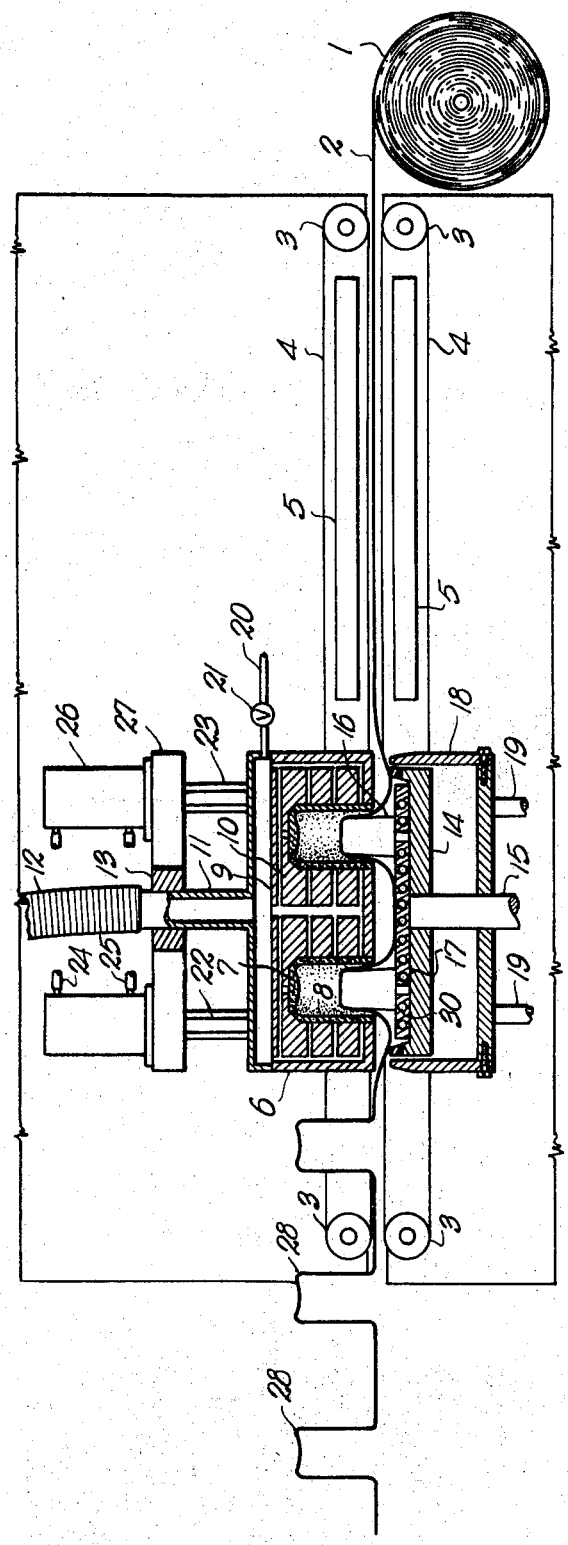
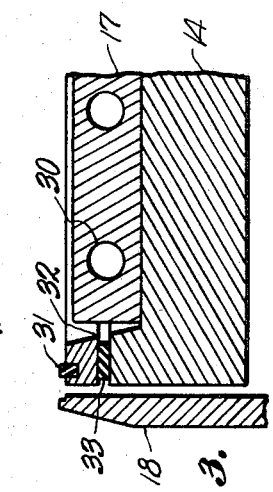
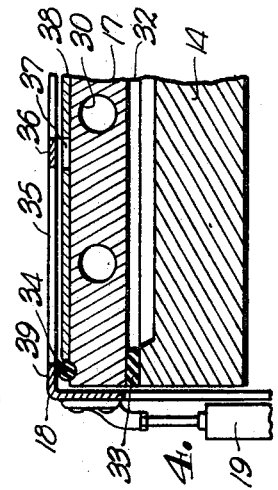
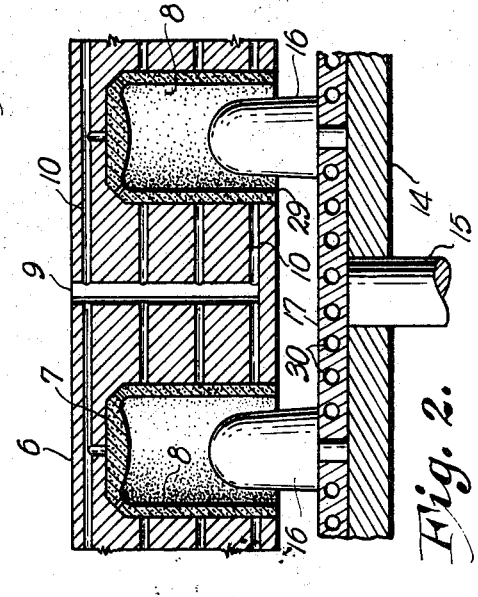
INVENTORS
RAYMOND H. MARTIN
JOHN MULLIGAN
JAMES E. YOCHIM
BY
ATTORNEY 3,527,854
METHOD FOR THE CONTINUOUS PRODUCTION OF OPEN TOP CONTAINERS
Raymond H. Martin, Beaverton, Mich., John Mulligan, Philadelphia, Pa., and James E. Yochim, Parsippany, N.J.; said Mulligan and said Yochim assignors to Gulf Oil Corporation, Pittsburgh, Pa., a corporation of Pennsylvania
Filed June 4, 1968, Ser. No. 742,969
Int. Cl. B29b 3/00; B29c 17/03, 17/04
U.S. Cl. 264—89     3 Claims

ABSTRACT OF THE DISCLOSURE

Method for producing petroleum oil cans by thermoforming with a cooled plate surrounding vacuum-assist plugs. Female shaping tools contact the upper side of a sheet to be formed and a clamp frame clamps the sheet against the female tools. A pressure box having a double seal at the top seals the sheet about the vacuum-assist plugs which are advanced into the female tools. The sealing of the pressure box against the sheet forces the sheet against the cooled plate so as to cool those areas of the sheet which are not disposed in the female tools. A differential pressure is applied to the sheet portions disposed in the female tools to form such portions against the female tools. Finger-shaped vacuum-assist plugs are found most efficient.

BACKGROUND OF THE INVENTION

This invention relates to an improved thermoforming method of forming a web of plastic into containers or other shaped work pieces.

Apparatus for the production of shaped plastic work pieces from a continuous web of thermoplastic material is known in the prior art in the patent to Thiel, U.S. 3,115,667 which is hereby incorporated by reference. However, several problems existed in the prior art when thin-walled containers were drawn deeply into the cavity molds of the shaping tool. It was found that it was very difficult to keep a uniform wall thickness. Also, when open topped containers having a lip specially adapted for crimping into a cover lid were formed, the slightest wear in the seal means at the top of the pressure box caused the pressure box to cant when in the sealed position against the shaping tool as the containers were being formed. This resulted in the pressure box pushing the vacuum-assist plug against the cavity mold at the chamfered opening of the cavity mold and pinching the lip portion of the container as it was being formed. Then when the lip portion was crimped into a cover lid, it would break or tear for lack of proper thickness. Also, thermoforming deep drawn containers has not been competitive economically with other operations such as blow molding because not enough of the web was drawn into the cavity mold, i.e., too much of the thermoplastic web was scrap which had to be rerun. Finally, previously known thermoforming operations left the web between the formed containers, before they were trimmed away from the original web, in a sagged or wrinkled condition, which made the final trimming difficult.

SUMMARY

The use of a cooled plate under the heated web of plastic as it is pushed into the cavity molds combined with other features of this invention results in up to 60% of the web being drawn into the cavity mold and leaving the remaining cooled web flat for ease in trimming away from the formed container. Also, the use of a double seal at the top of the pressure box allows the rim of the pressure box to tilt slightly when sealed to the clamp frame or shaping tool, but maintains the pressure box itself in a position parallel to the face of the shaping tool. In this way the lip (for crimping into the cover lid) on each container has uniform thickness as the containers are formed. Finger-shaped vacuum-assist plugs are found most efficient for formation of 35 mil thick cylindrical, open-top containers from 110 mil thick high-density polyethylene to use as motor oil cans. It was found that (1) Contacting the vacuum-assist plugs with the heated polyethylene web to push the web toward the cavity molds before the clamp frame seals it to the shaping tool,
(2) Using the cooled plate,
(3) Using optimum timing of the bleed and vacuum-pressure cycle, and
(4) Using finger-shaped vacuum-assist plugs, all contribute to drawing enough plastic web into the cavity mold to make operation economically competitive.

BRIEF DESCRIPTION OF THE DRAWING

FIG. 1 is a diagrammatic and sectional elevation of the apparatus.

FIG. 2 is a fragmentary sectional elevation of the shaping tool and pressure box.

FIG. 3 is a fragmentary sectional elevation of the double seal means on the pressure box.

FIG. 4 is a fragmentary sectional elevation of the preferred double seal means, clamp frame and cooled plate. This preferred embodiment shows the pressure box about to seal against the clamp frame.

PREFERRED EMBODIMENTS

FIG. 1 shows a roll 1 of thermoplastic sheet, such as high-density polyethylene sheet, which is disposed from the roll 1 into a web 2 by conveying devices 3 and engaged and supported by moving supports 4 into heating elements 5. A shaping tool 6, having cavity molds 7 with previous metal inserts 8, main vacuum line 9 and branch vacuum lines 10 connecting to fixed vacuum supply line 11 which in turn connects to flexible vacuum line 12 through seal 13, is used to shape containers. A pressure box 14 mounted on support 15 supports vacuum-assist plugs 16 and cooled plate 17. A clamp frame 18 is mounted on supports 19. Shaping tool 6 has a bleed line 20 and bleed valve 21. Shaping tool 6 is mounted on piston rods 22 between guides 23 so that it can be hydraulically raised and lowered by displacing hydraulic fluid through inlet 24 and outlet 25 in cylinders 26 which are mounted on rigid member 27. Formed containers are conveyed onto the trimming station not shown. Also pressure box 14 and clamp frame 18 are independently slideably mounted by means of pistons not shown but similar to pistons 22 by means of supports 19 and 15.

In FIG. 2 shaping tool 6 having cavity molds 7 containing pervious inserts 8, main vacuum line 9 and branch vacuum lines 10 shows the chamfered edge 29 of the pervious inserts 8 which forms the lip specially adapted to crimping into a cover. Also FIG. 2 shows pressure box 14 and cooling plate 17 with cooling channels 30 in cooled plate 17. FIG. 2 shows the preferred finger-shaped vacuum-assist plugs 16.

FIG. 3 shows pressure box 14, with cooled plate 17 and cooling channels 30, adjacent to clamp frame 18. In addition to a normal seal 31 along the outer rim of pressure box 14, FIG. 3 shows an additional channel 32 containing an elastomer seal 33 so that normal seal 31 and channel 32 combined with elastomeric seal 33 provide a double sealing means.

FIG. 4 shows the preferred embodiment of the clamp frame 18, double seal means 33 and 34, cooled plate 17, and clamp frame support 19. Clamp frame support 19 attaches to the outside of clamp frame 18. Cooled plate 17 has an additional plate 38 attached to the top. Plate 38 has openings 37 in register with and adapted for seating lattice shaped portions 35 and 36 of clamp frame 18. This lattice shaped portion 35 and 36 of clamp frame 18 forms rectangular openings in register with each of the vacuum-assist plugs 16. The outer edge of clamp frame 18 has a rim 39, to which an O-ring 34 seals when pressure box 14 is in its upper position. The lower portion of the double sealing means is seal 33 in channel 32.

The preferred method for the continuous production of 30 to 35 mil thick open top containers having a lip specially adapted for crimping into the cover lid so as to form a petroleum oil can from an elongated web of 110 mil thick, 35 to 60% oriented in the machine direction, and about 30% oriented in the transverse direction, high-density (above 0.945) polyethylene (by 35 to 60% oriented in the machine direction is meant that the polyethylene film is stretched 35 to 60% over the original length in the same direction as it was extruded from the extruding machine, and by about 30% oriented in the transverse direction means polyethylene film was stretched 30% over its original width across the width of the extruded material) is as follows. A web 2 of polyethylene from roll 1 is disposed in a substantially horizontal plane by conveying devices 3 and supports 4. The web is heated by heaters 5 to a temperature between about 340 to 350° F. so that it is softened and tends to sag. The moving heated web 2 is stopped in a position under shaping tool 6. Shaping tool 6 moves downward while at the same time the pressure box 14 moves upward toward the web 2. Pressure box 14 has vacuum-assist plugs 16 mounted in register with each cavity mold 7 in shaping tool 6. Pressure box 14 also has a cooled plate 17 disposed within pressure box 14 surrounding vacuum-assist plugs 16 and in register with the face of shaping tool 6 and occupying the entire area adjacent to vacuum-assist plugs 16 and located so that when pressure box 14 is in its upper position, the cooled plate 17 presses web 2 against shaping tool 6. The web 2 is then contacted by the vacuum-assist plugs 16. Then the shaping tool 6 stops in its lower position in contact with the web 2, and the clamp frame 18 seals the web 2 against the shaping tool 6 at the same time. The vacuum-assist plugs 16 move up into the cavity molds 7 while the vacuum bleed line 20 opens by means of valve 21 to bleed air from cavity mold 7 to prevent excessive pressure build up between shaping tool 6 and web 2. The cooled plate 17 pushes the web 2 against the face of shaping tool 6 and at the same time pressure box 14 in its upper position seals against clamp frame rim 39 as shown in FIG. 4. Alternatively, the pressure box can seal against web 2 at shaping tool 6 face as shown in FIGS. 1 and 3. Then a differential pressure across web 2 is established by means of a conventional air pressure supply line not shown to pressure box 14 and vacuum supply lines 11 and 12. Typically, pressure is applied to the heated web as soon as the pressure box 14 seals, while valve 21 is closed and vacuum is applied through vacuum line 12. The web is formed into open containers 28 by forcing the web 2 into intimate contact with the cavity mold inserts 8 by the differential pressure established. The formed containers are cooled by circulated coolant means not shown in the cavity molds 6 and by the cooling plate 17. Cavity mold 6, pressure box 14 and clamp frame 18 are all retracted, separating the open containers 28 from the shaping tool 6 vacuum-assist plugs 16 and cooled plate 17. Then the open containers formed in the web 2 are moved on to a cutting station (not shown) and cut away from remaining web 2. The cycle is then repeated with the next adjacent section of web 2.

Other materials, such as $C_2$ to $C_5$ polyolefins or polystyrene, may be used to thermoform containers of different shapes by means of this invention. Also, the position of the apparatus may be modified. For example, the shaping tool can be positioned below the web with the pressure box and clamp frame above, or they can also be positioned in facing vertical planes. The timing of movement of apparatus can also be modified within the scope of this invention. The means for mounting and moving the shaping tool, clamp frame and pressure box can be any of the known conventional means, such as by using toggles with platen and the like. The timing of the pressure and vacuum valves can also be varied to achieve best operation.

We claim:

1. A method for the continuous production of 30 to 35 mil thick open top containers having a lip specially adapted for crimping into a cover lid so as to form a petroleum oil can from an elongated web of 110 mils thick, about 35 to 60% oriented in the machine direction, and about 30% oriented in the transverse direction, high-density polyethylene comprising:
   (a) disposing said web of polyethylene in a substantially horizontal plane,
   (b) heating said web to a temperature between about 340 to 350° F. so that it is softened and tends to sag, then
   (c) moving said heated web to a position under a shaping tool having downwardly opening cavity molds, then
   (d) moving said shaping tool toward said heated web, while at the same time
   (e) moving a pressure box upward toward said web, said pressure box having mounted thereon vacuum-assist plugs in register with each cavity mold, said pressure box also having a cooled plate disposed within said pressure box surrounding said vacuum-assist plugs and in register with the face of said shaping tool and occupying the entire area adjacent to said plugs and located so that when said pressure box is in its upper position said cooled plate presses said web against said shaping tool,
   (f) contacting said web with said vacuum-assist plugs, then
   (g) stopping said shaping tool in its lower position in contact with said web, then
   (h) sealing said web against said shaping tool with a clamp frame, while at the same time,
   (i) moving said vacuum-assist plugs up into said cavity molds while at the same time,
   (j) opening a vacuum bleed line from said cavity molds to prevent excessive pressure build up between said shaping tool and said web, then
   (k) establishing a differential pressure across said web so that said web has a lesser pressure on the cavity mold side of said web, while
   (l) sealing said pressure box in its upper position against the rim of said clamp frame and at the same time
   (m) pushing said web against the face of said shaping tool with said cooled plate, thereby cooling said web, then
   (n) forming said open containers into final shape by forcing said web into intimate contact with pervious metal inserts in said cavity molds by means of said differential pressure,
   (o) cooling said open containers and web, then
   (p) separating said open containers and web from said shaping tool, plugs and cooled plate, then (q) moving said web containing said formed containers to a cutting station, and (r) cutting said open containers from said web, so that up to 60% of the weight of said web is drawn up into said cavity molds to form containers and so that said web remaining outside said cavity molds stays flat upon cooling to facilitate cutting said web away from said open container.

2. The method of claim 1 wherein said open containers are formed every 10 to 12 seconds.

3. The method of claim 1 wherein in said step (1) said pressure box seals against said shaping tool face.

References Cited
UNITED STATES PATENTS

| | | | |
|---|---|---|---|
| 3,115,677 | 12/1963 | Thiel | 264—92 |
| 3,290,418 | 12/1966 | Best | 264—92 |
| 3,341,895 | 9/1967 | Shelby. | |

ROBERT F. WHITE, Primary Examiner

J. H. SILBAUGH Assistant Examiner

U.S. Cl. X.R.

18—19; 264—92, 138, 327